US006870822B2

(12) United States Patent  
Balogh (10) Patent No.: US 6,870,822 B2  
(45) Date of Patent: Mar. 22, 2005

(54) METHOD AND EQUIPMENT FOR SUPPORTING MOBILITY IN A TELECOMMUNICATION SYSTEM

(75) Inventor: Peter Balogh, Tampere (FI)

(73) Assignee: Nokia Corporation, Espoo (FI)

( * ) Notice: Subject to any disclaimer, the term of this patent is extended or adjusted under 35 U.S.C. 154(b) by 717 days.

(21) Appl. No.: 09/785,567

(22) Filed: Feb. 20, 2001

(65) Prior Publication Data

US 2001/0024953 A1 Sep. 27, 2001

(30) Foreign Application Priority Data

Feb. 24, 2000 (FI) ................................................ 2000434

(51) Int. Cl.$^7$ ................................................ H04Q 7/00
(52) U.S. Cl. ...................... 370/332; 370/338; 455/436
(58) Field of Search ................................. 370/254, 328, 370/329, 330, 331, 332, 338, 252; 455/434, 436–444

(56) References Cited

U.S. PATENT DOCUMENTS

| | | | |
|---|---|---|---|
| 5,260,988 A | * 11/1993 | Schellinger et al. | ..... 455/552.1 |
| 5,815,811 A | 9/1998 | Pinard et al. | |
| 5,839,070 A | * 11/1998 | Lupien et al. | ............... 455/440 |
| 5,862,489 A | * 1/1999 | Aalto | ......................... 455/522 |
| 5,875,186 A | * 2/1999 | Belanger et al. | ............ 370/331 |
| 5,987,062 A | 11/1999 | Engwer et al. | |
| 5,991,287 A | * 11/1999 | Diepstraten et al. | ........ 370/338 |
| 6,144,855 A | * 11/2000 | Slovin | ..................... 455/432.1 |
| 6,332,077 B1 | * 12/2001 | Wu et al. | ................. 455/432.1 |
| 6,791,959 B1 | * 9/2004 | Palmer et al. | ............... 370/332 |

FOREIGN PATENT DOCUMENTS

| | | |
|---|---|---|
| EP | 967 815 | 12/1999 |
| EP | 1 017 197 | 7/2000 |
| WO | WO 99/46900 | 9/1999 |

OTHER PUBLICATIONS

"Simplify Mobile Computer Network Access," Symantex White Paper Series, vol. XLVI, 1999, 12 pp.
"Draft Standard for Information Technology: Part 11: Wireless LAN Medium Access Control (MAC) and Physical Layer (PHY) Specifications," LAN MAN Standards Committee of the IEEE Computer Society, 1999, 531 pp.

* cited by examiner

*Primary Examiner*—Hassan Kizou
*Assistant Examiner*—Alan V. Nguyen
(74) *Attorney, Agent, or Firm*—Pillsbury Winthrop LLP (57) ABSTRACT

A method for supporting mobility in a wireless telecommunication system which comprises at least one terminal, an access point currently serving the terminal and a plurality of other access points. The access points may be grouped into networks and the terminal is arranged to collect information about available access points. The network names of the available access points are checked by the terminal. The first access point with the best connection attributes of the available access points with the same network name as the currently serving access point is selected. The second access point with the best connection attributes of the available access points with a different network name than the currently serving access point is also selected. One or more connection attributes of the first access point and the second access point are compared. The connection to the second access point is established if the differences between the compared connection attributes fulfil pre-determined conditions.

22 Claims, 3 Drawing Sheets

Fig. 1

| WLAN-specific settings | Non-WLAN-specific settings |
|---|---|
| Operation mode ! (ad-hoc/Infrastructure | DHCP usage (Yes/no) |
| Network name ! | TCP/IP settings: |
| Channel ! (automatic/manually set) | IP addresses |
| Data rate | Gateways |
| WEP related settings: | DNS servers |
| Key length | WINS servers |
| Key mode | Proxy settings |
| Default key | Domain logon and workgroup settings |
| Keys or names of keys | Other |
| Other | |

METHOD AND EQUIPMENT FOR SUPPORTING MOBILITY IN A TELECOMMUNICATION SYSTEM

BACKGROUND OF THE INVENTION

The present invention relates to a method and equipment for supporting mobility in a telecommunication system.

The proportion of mobile workforce with portable computers is growing all the time. These mobile users need to access their computer networks from multiple locations. Besides ordinary local area networks, wireless local area networks (WLANs) have entered the markets enabling wireless access to computer networks. WLANs provide the ease of use as no cables are needed. Typically WLANs use radio frequency technologies; however, it is also possible to use e.g. infra-red connections. As cellular telecommunication systems, WLANs provide wireless connectivity using cells, called microcells. WLAN access is provided with WLAN adapters, which are implemented as PC cards in portable computers, ISA or PCI cards in desktop computers or integrated within hand-held computers.

There are many system settings involved when a terminal is accessing a wired or a wireless network. Typically needed settings are: connection method settings, dial-in settings, IP (Internet Protocol) settings and application settings. The connection method specifies the connection type, e.g. a direct network connection or a modem connection. Dial-in settings specify at least the access telephone number and dialing prefix, IP settings comprise the needed parameters for accessing IP networks and application settings set the parameters required by popular applications. Besides ordinary settings needed for accessing and using wired LANs, there are a number of WLAN specific settings that are different in various WLAN networks. For instance, different security keys and data rates may be used in different WLAN networks. Typically the settings need to be changed manually every time when the used network changes.

WLANs, as other wireless telecommunication systems, comprise support nodes providing access for mobile terminals to wired networks. In the WLAN these support nodes are typically called access points. Access points may be grouped into sub-networks and the sub-networks may form a logical network. Sub-networks are WLAN segments that belong to the same logical network but need different settings. Especially as different sub-networks typically have different IP address segments, TCP/IP (Transport Control Protocol/Internet Protocol) settings need to be changed every time the terminal moves from the area of one sub-network to another. When a terminal is connected to an access point in a first sub-network and the connection is changed to an access point of a second sub-network, it can be said that the terminal roams from the first sub-network to the second sub-network. WLAN users need to change the settings manually every time they want to access a different sub-network. Thus roaming between sub-networks (and also between logical networks) is cumbersome and requires user intervention. This takes time, often the terminal needs to be restarted. If the new access point is in a different logical network, the establishment of the connection takes even more time. As many users are not familiar with different network settings, they may need to contact IT (Information Technology) support persons for help.

BRIEF DESCRIPTION OF THE INVENTION

The object of the invention is to facilitate the mobility of users in a telecommunication system with a plurality of networks. The object of the invention is achieved with a method and a terminal which are characterized by what is disclosed in the independent claims. The preferred embodiments of the invention are set forth in the dependent claims.

The invention is based on the idea of keeping the connection in the same network as long as possible, The terminal collects information about available access points and checks the network names of the available access points. Access points may be any kind of nodes, such as base stations, providing access for terminals to fixed networks and the network names identify networks that access points belong to. The terminal selects a first access point with the best connection attributes of the available access points with the same network name as the currently serving access point and a second access point with the best connection attributes of the available access points with a different network name than the currently serving access point. One or more connection attributes of the first access point and the second access point are compared and a connection to the second access point is established if the differences between said compared connection attributes fulfil pre-determined conditions. Connection attributes may be any kind of attributes comprising information concerning the possible connections to access points.

One advantage of the invention is that the connection may be maintained in the access points of the same network as long as possible. When the connection attributes of the access points in the same network are not sufficient enough, another access point in different sub-network may be connected. In the case of WLAN networks, the connection may be maintained in the access points belonging to the same sub-network. There are also many possible ways to determine the connection attributes.

In a preferred embodiment of the invention, the user is informed if the differences between the said compared connection attributes fulfil the pre-determined conditions and the connection to the second access point is established if the user allows the connection. A further advantage of this embodiment is that the user has the possibility to control whether an access point in another network is accessed.

In another embodiment the connection to the first access point is established if the first access point is not the currently serving access point and at least one of the differences between the compared connection attributes does not fulfil the pre-determined conditions. According to this embodiment, the roaming between access points in the same network may be provided so that an access point with the best connection attributes (of the access points with the same network name) may be connected without loosing the connection.

Yet in one embodiment of the invention, the connection attributes are determined based on signal levels of available access points. The first and the second access point having the highest signal levels are selected. The signal levels of the first and the second access point are compared and it is checked if the difference of signal levels of the first access point and the second access point is above the pre-determined signal level limit. This way it is possible to select an access point that is typically closest to the terminal.

BRIEF DESCRIPTION OF THE DRAWINGS

In the following, the invention will be described in further detail by means of preferred embodiments and with reference to the accompanying drawings, in which.

DETAILED DESCRIPTION OF THE INVENTION

In a preferred embodiment the telecommunication network is assumed to be a wireless local area network based on the IEEE (Institute of Electrical and Electronics Engineers) 802.11 standard without limiting the invention to that kind of particular network. The invention can be used in any kind of telecommunications network where the user needs to change various settings when accessing different networks and network resources.

Figure 1:
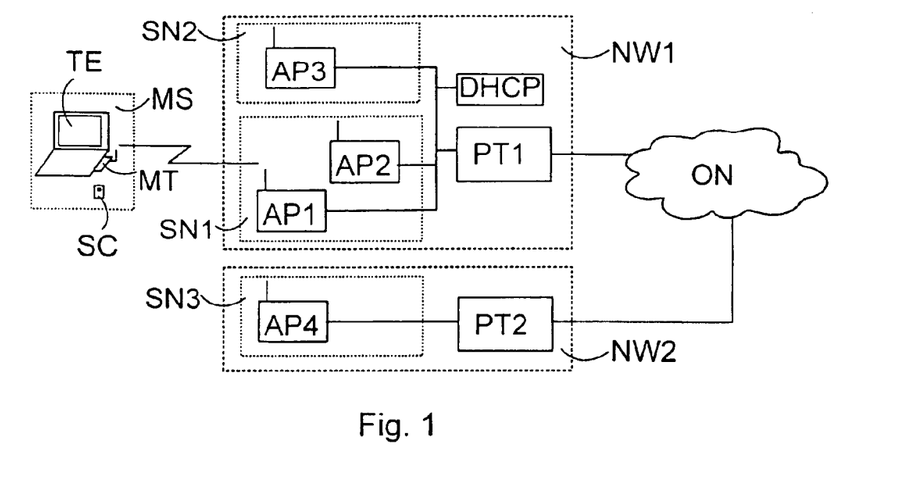
FIG. 1 is a block diagram showing a wireless telecommunication system based on the IEEE 802.11 specification.

In FIG. 1 an example of a WLAN system based on the IEEE 802.11 is shown. A mobile terminal MS comprises terminal equipment TE, typically a portable computer, a WLAN adapter MT and possibly also a smart card SC. A logical WLAN network NW1, NW2 comprises WLAN access points AP1, AP2, AP3 and AP4 providing the access for the MS to the wired network.

The 802.11 standard defines both the physical and medium access control protocols for communication over the air interface. The physical layer specification of the IEEE 802.11 encompasses three transmission options, one infrared option, direct sequence spread spectrum (DSSS) option, and frequency hopped spread spectrum (FHSS) option. Both spread spectrum techniques are used in the 2.4 GHz band because of wide availability in many countries. The IEEE 802.11 standard supports the DSSS for use with BPSK modulation at a 1 Mbps data rate, or QPSK modulation at a 2 Mbps data rate. The FHSS is supported under 802.11 with GFSK modulation and two hopping patterns with data rates of 1 Mbps and 2 Mbps. Also higher bit rates are expected in the near future.

The fundamental access method of the IEEE 802.11 MAC (Medium Access Control) is known as carrier sense multiple access with collision avoidance (CSMA/CA). The CSMA/CA works by a "listen before talk scheme". This means that a mobile terminal MS wishing to transmit must first sense the radio channel based on the received signal strength to determine if another terminal is transmitting. If the medium is not busy, the transmission may proceed. The CSMA/CA scheme implements a minimum time gap between frames from a given user. Once a frame has been sent from a given transmitting terminal MS, that terminal MS must wait until the time gap is up before trying to retransmit. Once the time has passed, the terminal MS selects a random amount of time (called a backoff interval) to wait before listening again to verify a clear channel on which to transmit. If the channel is still busy, the following backoff interval is selected that is shorter than the first backoff interval. This process is repeated until the waiting time approaches zero and the terminal MS is allowed to transmit. It is possible to use acknowledged data transfer, i.e. after a data frame is received, an acknowledgement frame is sent back verifying a successful data transmission.

WLAN mobile terminals MS may form an ad-hoc network simply by establishing a connection to another terminal. An ad-hoc network is a grouping of mobile stations for the purposes of internet-worked communications without the need of wired network infrastructure. An ad-hoc network forms a basic service set (BSS). Infrastructure networks are established to provide mobile terminals MS with specific services and range extension. Infrastructure networks are established by creating connections between access points AP1–4 and terminals MS. Access points AP1–4 provide network connectivity to MS, thus forming an extended service set (ESS). At a minimum, access points AP1–4 control the allocation of transmit times, receive, buffer, and transmit data between the mobile terminal MS and the wired parts of the logical network NW1, NW2. A logical WLAN network NW1, NW2 may comprise one or more sub-networks SN1, SN2 and SN3. The sub-networks comprise a plurality of access points AP1–4. For instance, NW1 comprises two sub-networks SN1 and SN2, the sub-network SN1 comprises two access points AP1 and AP2 and the SN2 comprises access point AP3. A logical WLAN network NW1, NW2 may also provide gateway access to other networks ON, such as the Internet, via a device called portal PT1, PT2. The portal PT1, PT2 is a logical entity that specifies the integration point where the IEEE802.11 specific logical network NW1, NW2 integrates with the non-IEEE802.11 network ON. Typically the logical WLAN network NW1, NW2 also comprises other servers, such as a DHCP (Dynamic Host Configuration Protocol) server which allocates IP addresses in the logical network NW1.

Security provisions are addressed in the standard as an optional feature. The data security is accomplished by an encryption technique known as the Wired Equivalent Privacy (WEP). WEP is based on protecting the transmitted data over the radio interface using an encryption key and an RC4 encryption algorithm. The IEEE 802.11 standard recommends 40 bit encryption keys but it also allows other key lengths. WEP, when enabled, only protects the data packet information and does not protect the physical layer header so that other mobile terminals in the network can listen to the control data needed to manage the network. However, the other mobile terminals cannot decrypt the data portions of the packet.

Individual microcells of access points AP1–4 overlap to allow continuous communication with wired parts of the logical network NW1, NW2. The mobile terminal MS may then connect to an access point with better signal strength as it moves to another geographic area. For more details on the IEEE 802.11 WLANs, reference is made to the IEEE 802.11 standards such as "Draft International Standard ISO/IEC 8802-11 IEEE 802.11/D10, January 1999, Part 11: Wireless LAN Medium Access Control (MAC) and Physical Layer (PHY) Specifications".

Figure 2:
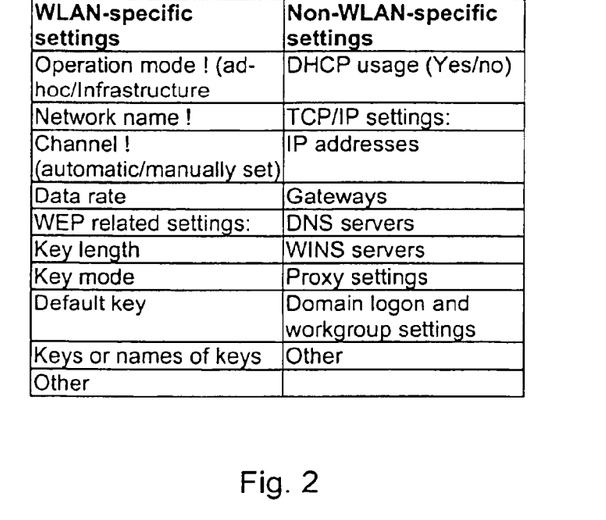
FIG. 2 is a table illustrating the settings described in information sets.

The settings needed to access networks and different network resources may be collected together and stored as information sets in the mobile terminal MS. Information sets advantageously comprise network names identifying networks belonging to the information sets. The information sets are advantageously separately determined for each logical WLAN network NW1, NW2 and they may be considered and called as profiles. Information sets may comprise basically any kind of settings needed to access the logical WLAN network NW1, NW2 in question and they may advantageously also comprise non-WLAN specific settings as illustrated in FIG. 2. Besides the settings needed to access networks, the information sets may also comprise settings needed to access network resources enabling different services by the network. The terminal MS basically always uses some network resources when it accesses a network, for instance the transmission capability of the access point AP1 is used to transfer data to the portal PT1.

The operation mode setting defines whether ad-hoc or infrastructure modes may be used. The network name setting defines the network names that belong to the information set. As the logical WLAN networks NW1, NW2 may be segmented into multiple sub-networks SN1–3, all sub-networks SN1–3 preferably have their own network names. An information set may thus comprise more than one wireless network name. If the used operation mode is infrastructure, the used network name is called ESSID (Extended Service Set Identifier) and if the used operation mode is ad-hoc, the network name is called BSSID (Basic Service Set Identifier).

A network identifier may be stored in the network name setting to cover more than one network name. A network identifier advantageously contains wildcard characters, such as '?' and '*', and by using wildcard characters it is possible to specify a group of network names. For this to work, every sub-network belonging to the same logical network should have a similar (not the same) name; for instance, the SN1 could have the network name NW1LAN1 and the SN2 could have the network name NW1LAN2. The network name setting of the information set of the NW1 may then be NW1WLAN*.

The channel settings define whether the operating radio channel is selected automatically or manually. The first three settings marked with '!' are essential and should be stored within each information set. The data rate setting may comprise information about the possible data rates, e.g. the logical network NW1, NW2 may provide 2 Mbps data rate. Security settings related to WEP preferably comprise key length, key mode, selected default key and keys or information on the keys used for authentication and/or encryption. It is suggested that the keys should not be part of the information set; they can be stored elsewhere but the information set references them. Other WLAN specific settings may comprise radio-related parameters or any other settings that may be needed. Other settings may be for instance different settings mentioned in the IEEE 802.11 standard, such as the fragmentation threshold or the listening interval.

Non-WLAN specific settings may also be included especially in information sets for infrastructure communications (operation mode is infrastructure). Typically the most important settings are DHCP settings, TCP/IP settings and domain logon and work-group settings. DHCP settings define whether DHCP is used or not. TCP/IP settings comprise information about the used IP addresses, gateways, DNS (Domain Name System) servers and WINS (Windows Internet Naming Service) servers. Proxy settings specify the correct WWW (World Wide Web) browser settings. Domain logon and workgroup settings may be needed to enable access to specific network services such as shared folders, email server, network printers, mapped network drives and Intranet pages. Also other kind of non-WLAN settings may be stored in the information sets.

The information sets may be stored in files and they may be distributed to users basically through any media. For instance, it is possible to download information sets from a WWW page or send the information sets by email. The mobile terminal MS may advantageously comprise a smart card SC where the information sets are stored. The smart card is preferably inserted in the MT, but it is also possible to use the SC with a card reader of the TE.

A secure connection for a new user to the company networks may be easily and quickly arranged by giving him the smart card SC comprising the necessary information sets. The information sets (for instance of NW1 and NW2) may be shown to the user by the user interface (UI) of the terminal MS.

Figure 3:
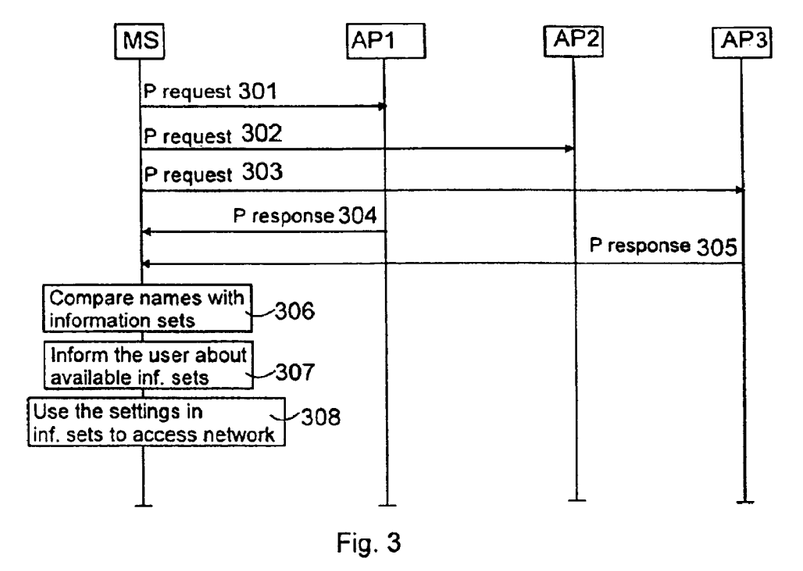
FIG. 3 is a signalling diagram illustrating the usage of information sets.

FIG. 3 illustrates one possible way to access a logical network NW1, NW2 utilizing the stored information sets. As a user of the MS wishes to originate a connection to a locally available logical network NW1, NW2, the WLAN functionality is activated. In order to find out the information sets and networks that may be used in the current location area of the terminal MS, the MS performs a scanning of available access points AP1–4 Scanning for access points AP1–4 as such is a basic functionality defined in the IEEE 802.11 standard, where the MS checks radio channels one-by-one by sending network identity requests (Probe requests) and searching for network identity responses (Probe responses). The MS sends Probe requests 301, 302, 303 to local access points, for instance to AP1, AP2 and AP3, and waits for Probe responses. For instance, the access points AP1 and AP3 receive the Probe requests 301, 303 and send back Probe responses comprising information of the access point 304, 305. Preferably the Probe responses 304, 305 comprise network names of the sub-networks SN1–3 the access points AP1–4 belong to.

The MS may use the scanned information to determine which information sets may be used 306. For instance, as the MS receives Probe responses 304, 305 from the AP1 and AP3, it compares 306 the network names in the Probe responses 304, 305 to the network names in the stored information sets and finds out that sub-networks SN1 and SN2 are available. As the group of network names is advantageously specified (e.g. NW1 LAN*), the network names (NW1LAN1, NW1LAN2) belonging to the same information set can be easily found. Further, the information set of the SN1 is then fully available, as the network names of the SN1 (NW1LAN1) and SN2 (NW1LAN2) are found. If there are more than one access point (AP1, AP2) in a single sub-network (SN1), the MS may receive the same network name many times in separate Probe responses. Thus the terminal MS can reliably determine the available logical networks and information sets, typically also the existing network names and identity requests may be used.

As the terminal MS is aware of the available information sets, it may inform 307 the user of the MS about the available information sets, If there are more than one information set available, the user may be provided with the chance of selecting the information set to be used. The information set that is available and approved by the user will then be used and at least the logical WLAN network NW1, NW2 may be accessed 308 using the settings stored within the selected information set. However, fully automatic information set selection can also be used, that is, one of the available information sets is selected without any user intervention and the settings of the selected information set are used to access a network.

The wireless connection to the logical WLAN network NW1, NW2 may be established using the WLAN specific settings of the selected information set and the connection to other networks or servers may be established using the non-WLAN-specific settings. The WLAN specific settings are related for establishing the wireless connection, that is, for accessing an access point AP1–4 and its resources, The non-WLAN specific settings are mainly used by the operation system of the MS for providing support for other applications of the terminal, The non-WLAN specific settings are often used to access different network resources, for instance the DHCP server is accessed in order to obtain an IP address. The usage of the settings illustrated in FIG. 2 to access networks and network resources is as such familiar to a man skilled in the art.

Scanning is preferably carried out each time the user activates the WLAN functionality and wishes to access a network. However, it is also possible to perform the scanning during an on-going connection e.g. periodically. In FIG. 3 the operation mode was the infrastructure mode and scanning of access points was described. The scanning may as welt be done for other terminals (ad-hoc mode) and the terminals at the area may send their identities. The identities may then be compared to the stored information sets and the available information sets for ad-hoc mode may be used. Thus the accessed network may actually be another terminal and an ad-hoc network may be established.

In addition to the example illustrated in FIG. 3, the settings of the selected information set may also be used to access another network ON, for instance a corporate Intranet email server in another country. Thus it is possible to access a first network by using first settings of an information set and then use services of a second network using second settings of the information set. The information sets enable easy access to WLAN network NW1, NW2 and also to other networks ON. When the information sets are pre-stored, the user of MS does not have to be aware of any network or system settings needed.

Figure 4:
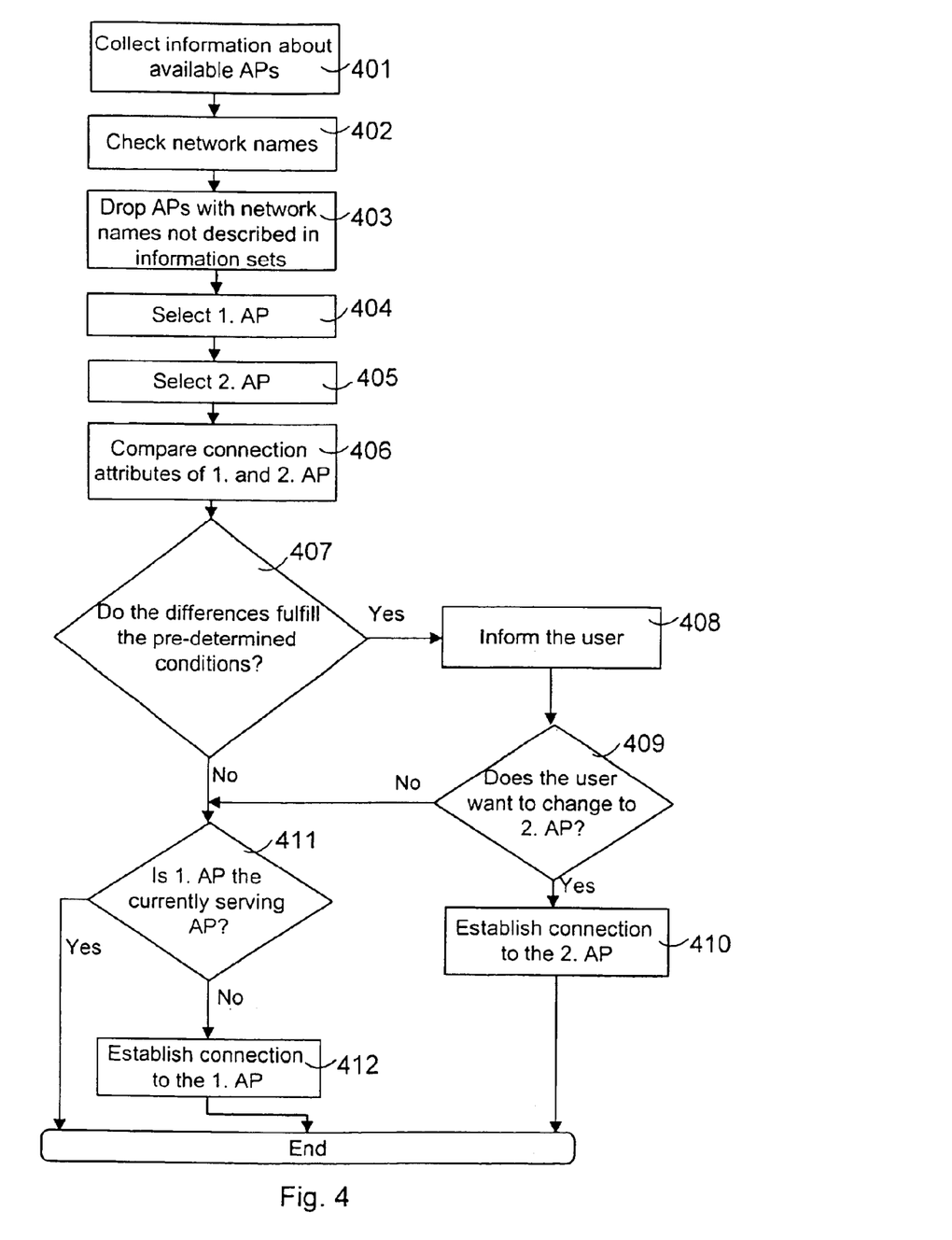
FIG. 4 is a flow chart illustrating the selection of access points according to a preferred embodiment of the invention.

FIG. 4 illustrates the selection of access points according to a preferred embodiment of the invention. Typically different sub-networks have different IP address segments and thus different TCP/IP protocol settings. In the case of roaming between sub-networks SN1–3, that is, between access points AP1–4 of different sub-networks SN1–3, these settings must be changed. The change of these TCP/IP settings will break the on-going connections. According to a preferred embodiment of the invention, the terminal MS, by using the network names, takes care that the connection is maintained in the same sub-network SN1–3 as long as possible.

A connection has been established with a currently serving access point for instance using the information sets as described earlier. The terminal MS collects 401 information advantageously periodically about the available access points. The period is preferably adjustable and it can be changed according to the terminal MS. The access points AP1–4 typically send access point reports periodically. The access point report comprises at least the network name of the access point as well as other information on the access point AP1–4. The other information may comprise for instance the access point load (that is, how many terminals are using the access point), information about the used bandwidth, information about the supported data rates or security information. The terminal MS may collect these access point reports from every access point AP1–4, that is, from every access point that can be recognized in the WLAN frequency band. It is also possible that the terminal MS sends requests to the access points AP1–4 and the available access points respond by sending access point information.

The terminal MS then checks 402 the network names of the available access points based on the collected information. According to an embodiment, the MS compares the network names of available access points advantageously to the network name settings of the stored information sets and drops access points with network names not described in any of the network name settings 403. The MS compares the connection attributes of access points with the same network name as the currently serving access point, compares the connection attributes of access points with the different network name than the currently serving access point and selects access points with the best connection attributes. Connection attributes may be any kind of attributes comprising information concerning the possible connections to access points. MS selects 404 a first access point having the best connection attributes of the available access points with the same network name as the currently serving access point. The MS also selects 405 a second access point having the best connection attributes of the available access points with a different network name than the currently serving access point.

The connection attributes are determined based on the collected information about the access points, advantageously based on the access point reports and signal levels of different access points. The same information may be used as in the access point reports and the terminal MS may compare the connection attributes of different access points by comparing the information received from different access point reports. Preferably at least the signal level is considered when comparing the available access points. Information from the access point reports such as access point load, supported data rates and security information may also be considered when comparing the access points. Also especially the access point load may be an important connection attribute. If only signal levels are considered, the signal levels of different access points are simply compared and the access point with the highest signal level is the access point with the best connection attributes. If more than one connection attributes are considered, different connection attributes are advantageously weighted differently. There are many ways to carry out the comparison of access points and connection attributes may be weighted differently for diverse users.

For instance, the signal level is considered to be the most important connection attribute (weight 80%) and the access point load is another considered connection attribute (weight 20%). Mathematical reference values may be determined for available access points based on the weighting and the access points having the highest values are selected as the best access points. Information of the connection attributes may be stored in information sets. As already described, the best access points are advantageously selected separately among the available access points with same network name as the currently serving access point (first AP 404) and among the available access points with different network name than the currently serving access point (second AP 404).

The MS compares 406 one or more connection attributes of the first and the second access point. It is checked 407 whether the differences between the compared connection attributes of the first and the second access point fulfil pre-determined conditions. The pre-determined conditions may comprise conditions for different connection attributes related to the access point comparison. Preferably at least a limit for signal level difference is used, that is, the signal levels of the first and the second access point are compared and it is checked if the difference of signal levels of the first access point and the second access point is above the pre-determined signal level limit. By using the signal level, it is often possible to select an access point that is closest to the terminal. Also other conditions may be used, for instance separately for each weighted factor. The pro-determined conditions are advantageously determined so that the connection stays in the access point with the same network name as long as possible.

If the differences fulfil the pre-determined conditions, according to a preferred embodiment the user is informed 408 of this, and it is checked 409 if the user wishes to change the connection to the second access point in another sub-network. In this case the connection to the second access point in another sub-network may be established 410 advantageously using the settings in the information sets only if the user allows the change. Again, the pre-determined conditions are advantageously adjusted so that the user is notified early enough, which allows the user to save documents and log out from databases, for example. However, it is also possible that the access point is automatically selected, that is, the connection to the second access point is established 410 if the differences fulfil the pre-determined conditions. The connection to the second access point is advantageously established only if all pre-determined conditions are fulfilled. The connection to the second access point is advantageously established by using the settings described in the information sets. If the second access point is in a different logical network (NW1, NW2), the used information set changes.

According to an embodiment, if the user does not want to connect the second access point or if advantageously at least one of the pre-determined conditions can not be fulfilled, it is checked whether the first access point is the currently serving access point. If not, the second access point may be connected 412. If the first access point is the currently serving access point, no changes are needed. The information collection, the selection of the first and the second access point and comparison of the connection attributes are advantageously performed periodically, e.g. every time the access point reports are received.

For instance, the MS may roam freely between the access points AP1 and AP2 of the sub-network SN1. However, when the MS is moving to an area of an access point belonging to another sub-network, e.g. to AP3, the MS takes care that the connection is maintained in the SN1 as long as possible. When the difference between the connection attributes of access points AP1 and AP3 fulfils the pre-determined conditions, the MS advantageously notifies the user and offers the possibility to change the connection to the sub-network SN2.

When connecting the second access point in a different sub-network (than the currently serving access point), typically at least the TCP/IP settings need to be renewed by connecting to a DHCP server which assigns a new IP address for the MS. It should be noted that the above-mentioned steps may be carried out in different order, for instance the second access point is determined before the first access point.

The above-mentioned procedures enable the connection to be maintained in the same sub-network as long as possible without loosing the connection. However, when the connection attributes of the access points in the same sub-network are not sufficient enough, another access point in different sub-network may be connected. There are many possible ways to determine the connection attributes and according to an embodiment there are even more possibilities as the connection attributes may be weighted differently. According to an embodiment, the roaming between access points in the same sub-network may be provided so that an access point with the best connection attributes (of the access points with the same network name) may be connected without loosing the connection.

The above illustrated access point selection may also be used when there are no information sets stored. In this case the terminal MS also collects information of the available access points and checks the network names of the available access points. The network names of the available access points are compared with the currently serving access point and the first and the second access points with the best connection attributes are selected. One or more connection attributes of the first and the second access point are compared and the connection may be established to the second access point if the differences between the compared connection attributes fulfil pre-determined conditions. The user of the MS may then need to change the settings in order to establish the connection to the second access point.

Figure 5:
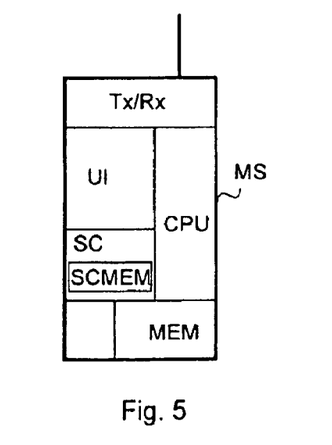
FIG. 5 is a block diagram illustrating a mobile station according to a preferred embodiment of the invention.

FIG. 5 illustrates the basic functionality of a mobile terminal MS according to a preferred embodiment of the invention. The terminal MS comprises a transceiver Tx/Rx with antennas, a user interface UI, a control unit CPU, memory MEM and a smart card SC. The transceiver Tx/Rx may be typical 802.11 compliant transmitting and receiving equipment for transmitting and receiving data over the radio interface. As already described the smart card comprises a memory SCMEM where the information sets may be advantageously stored as profiles. The memory means of the mobile station MS may thus comprise two parts; the memory MEM and the smart card memory SCMEM.

The user interface means UI generally comprise a keyboard, a display, a loudspeaker and a microphone, which are not presented in FIG. 5. With the user interface means UI, the control unit CPU may according to a preferred embodiment inform the user about the second access point with better connection attributes and the user may allow the connection. By using the user interface UI, it is advantageously possible to view and change the settings of the stored information sets and give further instructions to the control unit CPU. According to an embodiment, the user may also form new information sets or modify already existing ones by using the user interface UI.

The control unit CPU controls the inventive functions described earlier in connection with the selection of access points. The CPU is arranged to provide collecting means to collect (401) information on the available access points using the transceiver Tx/Rx. Further, the control unit CPU may be arranged to provide checking means to check (402) the network names based on the collected information and selection means for selecting (404, 405) the first access point and the second access point with the best connection attributes. The control unit CPU may be arranged to provide comparison means for comparing the connection attributes of the first access point and the second access point and access means to establish connection to a new access point (410, 412) if the differences between the connection attributes fulfil pre-determined conditions. The connection is established utilizing the transceiver Tx/Rx. According to an embodiment, CPU is arranged to take care of the storing of information sets in the memory means, advantageously in the smart card memory SCMEM using the smart card reader of MS and the smart card controller CNTRL. All the inventive functionalities by the control unit CPU may be implemented by using the existing processors and memory MEM, SCMEM of the mobile terminals MS.

It is also possible to use the above described access point selection in multimode WLAN terminals that also comprise other mobile telecommunication functionalities, such as the GSM functionality. According to an embodiment, it is also possible to apply the inventive access point selection in equipment based on other kinds of wireless local area networking techniques, for instance in Bluetooth, Hiper-LAN (High Performance Radio Local Area Network) or BRAN (Broadband Radio Access Networks) equipment.

It is obvious to those skilled in the art that as technology advances, the inventive concept can be implemented in many different ways. Therefore the invention and its embodiments are not limited to the above examples but may vary within the scope and spirit of the appended claims.

What is claimed is:

1. A method for supporting mobility in a wireless telecommunications system, the system including at least one terminal, an access point currently serving the terminal and a plurality of other access points, wherein the access points may be grouped into networks and the terminal is configured to collect information related to available access points, the method comprising:

checking network names of the available access points;

selecting a first access point with best connection attributes from among the available access points having a network name that matches a currently serving access point;

selecting a second access point with best connection attributes from among the available access points having a different network name than the currently serving access point;

comparing one or more connection attributes of the first access point and the second access point; and establishing a connection to the second access point if differences between the compared connection attributes fulfil pre-determined conditions.

2. The method of claim 1, further comprising:

informing a user of the terminal if the differences between the compared connection attributes fulfil the pre-determined conditions, wherein the establishing is performed if the user allows the connection.

3. The method of claim 1, further comprising establishing a connection to the first access point if the first access point is not the currently serving access point and at least one of the differences between the compared connection attributes does not fulfil the pre-determined conditions.

4. The method of claim 1, further comprising:

determining the connection attributes based at least on signal levels of available access points;

wherein the selecting includes selecting the first and the second access point having respective first and second highest signal levels, comparing includes comparing signal levels of the first and the second access points, and establishing is performed if a difference between the first and second highest signal levels is above a pre-determined signal level limit.

5. The method of claim 1, further comprising:

storing information sets identifying networks by network names in the terminal;

comparing network names of available access points to the network names stored in the information sets; and dropping access points with network names not described in any of the stored information sets.

6. The method of claim 5, wherein the stored information sets describe settings needed to access networks and their resources, and the connection to the second access point is established using the settings described in the stored information sets.

7. The method of claim 1, further comprising collecting information about available access points, wherein the selecting the first and the second access point and the comparing the one or more connection attributes are performed periodically.

8. The method of claim 1, wherein the networks are sub-networks of logical wireless local area networks.

9. A terminal comprising:

a transceiver configured to communicate with an access point;

collecting means for collecting information related to available access points;

checking means for checking the network names of the available access points;

selection means for selecting a first access point having best connection attributes of the available access points having a network name matching a currently serving access point and configured to select a second access point having best connection attributes of the available access points having a different network name than the currently serving access point;

comparison means for comparing one or more connection attributes of the first access point and the second access point; and access means for establishing a connection to the second access point if differences between the compared connection attributes fulfil pre-determined conditions.

10. The terminal of claim 9, further comprising:

user interface means for informing a user of a terminal if the differences between the compared connection attributes fulfil the pre-determined conditions, wherein the access means are arranged to establish a connection to the second access point if the user allows the connection.

11. The terminal of claim 9, wherein the access means are arranged to establish a connection to the first access point if the first access point is not the currently serving access point and at least one of the differences between the compared connection attributes does not fulfil the pre-determined conditions.

12. The terminal of claim 9, wherein different connection attributes are weighted differently.

13. The terminal of claim 9, further comprising:

memory means for storing information sets identifying networks by network names and describing settings needed to access networks and associated network resources, wherein the checking means are arranged to compare the network names of available access points with network names stored in the information sets, drop access points with network names not described in any of the stored information sets, and establish a connection to the second access point using the settings described in the stored information sets.

14. The terminal of claim 9, wherein the connection attributes are determined at least based on signal levels of the available access points, wherein the selection means are arranged to select the first and the second access point having highest signal levels, wherein the comparison means are arranged to compare the signal levels of the first and the second access point, and wherein the access means are arranged to establish a connection to the second access point if the difference between the respective first and second signal levels is above a pre-determined signal level limit.

15. The terminal of claim 9, wherein the terminal is a mobile terminal and is arranged to access wireless local area networks.

16. A terminal comprising:

a transceiver configured to communicate with an access point;

at least one collector configured to collect information related to available access points;

at least one checker configured to check the network names of the available access points;

at least one selector configured to (i) select a first access point having best connection attributes of the available access points having a network name matching a currently serving access point and (ii) select a second access point having best connection attributes of the available access points having a different network name than the currently serving access point;

at least one comparator configured to compare one or more connection attributes of the first access point and the second access point; and at least one access device configured to establish a connection to the second access point if differences between the compared connection attributes fulfil pre-determined conditions.

17. The terminal of claim 16, further comprising:

at least one user interface configured to inform a user of a terminal if the differences between the compared connection attributes fulfill the pre-determined conditions, wherein the at least one access device is arranged to establish a connection to the second access point if the user allows the connection.

18. The terminal of claim 16, wherein the at least one access device is configured to establish a connection to the first access point if the first access point is not the currently serving access point and at least one of the differences between the compared connection attributes does not fulfil the pre-determined conditions.

19. The terminal of claim 16, wherein different connection attributes are weighted differently.

20. The terminal of claim 16, further comprising:

at least one memory device configured to store information sets identifying networks by network names and describing settings needed to access networks and associated network resources, wherein the at least one checker is configured to (i) compare the network names of available access points with network names stored in the information sets, (ii) drop access points with network names not described in any of the stored information sets, and (iii) establish a connection to the second access point using the settings described in the stored information sets.

21. The terminal of claim 16, wherein the connection attributes are determined at least based on signal levels of the available access points, wherein the at least one selector is configured to select the first and the second access point having highest signal levels, the at least one comparator is configured to compare the signal levels of the first and the second access point, and the at least one access device is configured to establish a connection to the second access point if the difference between the respective first and second signal levels is above a pre-determined signal level limit.

22. The terminal of claim 16, wherein the terminal is a mobile terminal and is arranged to access wireless local area networks.

* * * * *

UNITED STATES PATENT AND TRADEMARK OFFICE
CERTIFICATE OF CORRECTION

PATENT NO. : 6,870,822 B2  
DATED : March 22, 2005  
INVENTOR(S) : Peter Balogh

Page 1 of 1

It is certified that error appears in the above-identified patent and that said Letters Patent is hereby corrected as shown below:

<u>Title page,</u>
Item [30], Foreign Application Priority Data, replace
"Feb. 24, 2000 (FI) 2000434" with -- Feb. 24, 2000 (FI) 20000434 --.

Signed and Sealed this

Twenty-sixth Day of July, 2005

JON W. DUDAS
*Director of the United States Patent and Trademark Office*